(12) United States Patent
Kato et al.

(10) Patent No.: US 7,682,751 B2
(45) Date of Patent: Mar. 23, 2010

(54) LITHIUM ION SECONDARY BATTERY AND CHARGING METHOD THEREFOR, AND CHARGE OR CHARGE/DISCHARGE CONTROL SYSTEM FOR LITHIUM ION SECONDARY BATTERY

(75) Inventors: Kiyomi Kato, Moriguchi (JP); Kaoru Inoue, Hirakata (JP)

(73) Assignee: Panasonic Corporation, Osaka (JP)

( * ) Notice: Subject to any disclaimer, the term of this patent is extended or adjusted under 35 U.S.C. 154(b) by 64 days.

(21) Appl. No.: 11/085,106

(22) Filed: Mar. 22, 2005

(65) Prior Publication Data

US 2005/0221172 A1    Oct. 6, 2005

(30) Foreign Application Priority Data

Mar. 30, 2004    (JP)    ............................. 2004-098986
Oct. 5, 2004     (JP)    ............................. 2004-292226

(51) Int. Cl.
*H01M 2/14*    (2006.01)
*H01M 2/16*    (2006.01)
*H02J 7/00*    (2006.01)

(52) U.S. Cl. ................. 429/246; 429/129; 429/247; 429/249; 429/251; 429/252; 320/128

(58) Field of Classification Search ................. 429/246, 429/129, 247, 249, 251, 252; 320/128
See application file for complete search history.

(56) References Cited

U.S. PATENT DOCUMENTS

| | | |
|---|---|---|
| 5,147,739 A | 9/1992 | Beard |
| 6,051,340 A | 4/2000 | Kawakami et al. |
| 6,053,953 A * | 4/2000 | Tomiyama et al. ......... 29/623.1 |
| 6,287,720 B1 | 9/2001 | Yamashita et al. |

FOREIGN PATENT DOCUMENTS

| | | |
|---|---|---|
| EP | 0517070 A1 | 5/1992 |
| EP | 0715366 A1 | 6/1996 |

(Continued)

OTHER PUBLICATIONS

Kim et al. "Electrochemical and physical properties of composite polymer electrolyte of poly(methylmethacrylate) and poly(ethylene glycol diacylate)", Journal of Power Sources, 2003, 221-224, V. 124.

(Continued)

*Primary Examiner*—Patrick Ryan
*Assistant Examiner*—Julian Mercado
(74) *Attorney, Agent, or Firm*—McDermott Will & Emery LLP (57) ABSTRACT

A lithium ion secondary battery includes a positive electrode containing a composite lithium oxide, a negative electrode capable of absorbing and desorbing lithium ions, a sheet-like separator interposed between the positive electrode and the negative electrode, a non-aqueous electrolyte and a porous electron-insulating film attached to the surface of the negative electrode. The sheet-like separator is a monolayer film made of polypropylene resin or a multilayer film whose layer to be in contact with the positive electrode is made of polypropylene resin. The porous electron-insulating film includes an inorganic oxide filler and a binder. The sheet-like separator has a thickness not less than 1.5 times the thickness of the porous electron-insulating film.

7 Claims, 1 Drawing Sheet

FOREIGN PATENT DOCUMENTS

| | | |
|---|---|---|
| JP | 7-220759 | 8/1995 |
| JP | 07-220759 | 8/1995 |
| JP | 08-50922 | 2/1996 |
| JP | 08-255610 | 10/1996 |
| JP | 9-190814 | 7/1997 |
| JP | 10-012279 | 1/1998 |
| JP | 11-102730 | 4/1999 |
| JP | 2001-273880 | 10/2001 |
| JP | 2001-351686 | 12/2001 |
| JP | 2002-093405 | 3/2002 |
| JP | 2003-208891 | 7/2003 |
| JP | 2003-331824 | 11/2003 |

OTHER PUBLICATIONS

Supplementary European Search Report, issued in corresponding European Application No. 05720908.2-2119, dated on Apr. 12, 2007.

* cited by examiner

FIG. 1

LITHIUM ION SECONDARY BATTERY AND CHARGING METHOD THEREFOR, AND CHARGE OR CHARGE/DISCHARGE CONTROL SYSTEM FOR LITHIUM ION SECONDARY BATTERY

BACKGROUND OF THE INVENTION

In recent years, there has been a rapid advancement in the development of portable and cordless electronic devices. With this development, the commercialization of lithium ion secondary batteries having a high voltage and a high energy density as the power sources for driving these electronic devices is growing. The positive electrode for lithium ion secondary batteries usually uses, as the active material, a composite lithium oxide having a high oxidation-reduction potential, namely, a composite lithium oxide containing a transition metal such as lithium cobalt oxide, lithium nickel oxide or lithium manganese oxide. The negative electrode uses, as the active material, a material capable of absorbing and desorbing lithium ions. Examples of the material include alloy materials and carbonaceous materials. The electrolyte is usually a non-aqueous electrolyte prepared by dissolving a lithium salt such as $LiClO_4$ or $LiPF_6$ in an organic solvent. Between the positive electrode and the negative electrode is placed a sheet-like separator for electronically insulating the electrodes from each other. The separator is usually a microporous film made of polyolefin resin material.

The lithium ion secondary battery has a problem that, when it is repeatedly charged and discharged, its battery capacity gradually decreases. One possible cause for this is that both the positive and negative electrodes expand during charge and contract during discharge. Due to the repeated expansion and contraction, the electrolyte is expelled from the electrode group comprising the positive electrode and the negative electrode, which reduces the reaction area, eventually reducing the battery capacity. Particularly, the negative electrode expands and contracts to a greater extent, and therefore the retention of electrolyte by the negative electrode greatly affects the charge/discharge cycle characteristics.

When the positive electrode uses, as the active material, a composite lithium oxide having an oxidation-reduction potential of 4 V level relative to that of a lithium metal, the lithium ion secondary battery has a problem that the capacity decreases significantly when the battery is fully charged and then kept at a high temperature for a long period of time. Presumably, this is due to the side reaction which involves the decomposition of the electrolyte and the oxidation degradation of the separator which is in contact with the positive electrode.

In order to improve the safety of the lithium ion secondary battery, there is proposed to form a porous electron-insulating film having a thickness of 0.1 to 200 μm and comprising an inorganic oxide filler and a binder on the electrode surface. The porous electron-insulating film is intended to prevent the active material from separating from the electrode current collector during the production thereof, and the separated active material from being attached to the electrode surface again. It is expected to prevent internal short-circuiting and to help improve the production yield (see Japanese Laid-Open Patent Publication No. Hei 7-220759, for example).

Further, in order to prevent the oxidation degradation of the separator, there is proposed to use a multilayer film separator comprising a plurality of layers in which the layer to be in contact with a positive electrode contains polypropylene resin (Japanese Laid-Open Patent Publication No. 2001-273880).

BRIEF SUMMARY OF THE INVENTION

The present inventors investigated the properties of a lithium ion secondary battery in which the porous electron-insulating film is attached to the surface of the negative electrode, and they observed a decrease in discharge rate characteristics and charge/discharge cycle life characteristics. Further, the present inventors found that the decrease in discharge rate characteristics correlates significantly with the total thickness of the porous electron-insulating film and the separator, and that the decrease in charge/discharge cycle life characteristics correlates significantly with the elasticity of the porous electron-insulating film. When the porous electron-insulating film has poor elasticity and does not easily expand and contract, it cannot follow the expansion and contraction of the electrode group during charge and discharge, and the active material separates from the electrode current collector, resulting in a decrease in current collecting efficiency.

Furthermore, the present inventors produced a battery comprising a separator comprising a multilayer film whose layer to be in contact with the positive electrode was made of polypropylene resin, and then investigated the properties thereof. They found that the decrease in battery capacity when the battery was fully charged and then kept at a high temperature for a long period of time was successfully suppressed. They also found that, when the battery was put through repeated charge/discharge cycles where the battery was charged up to a high voltage of not less than 4.3 V, the charge/discharge cycle life characteristics thereof was insufficient, and that the cause thereof was the expansion of the electrode group which were extremely significant in the charge/discharge cycles where the battery was charged to a high voltage. Presumably, this is because, in the charge/discharge cycles where the battery is charged to a high voltage of not less than 4.3 V, the amount of electrolyte expelled from the electrode group is increased and the retention of electrolyte decreases significantly in the negative electrode that expands and contracts to a greater extent.

In order to overcome the foregoing problems, the present invention is intended to prevent the active material from separating from the electrode current collector, to suppress the capacity decrease when the lithium ion secondary battery in fully charged state is kept at a high temperature for a long period of time, and to improve the charge/discharge cycle life characteristics of the lithium ion secondary battery, particularly, the high voltage charge/discharge cycle life characteristics when the battery is charged to a voltage of not less than 4.3 V by optimizing the structure of the combination of the porous electron-insulating film (layer) and the separator.

The present invention relates to a lithium ion secondary battery comprising a positive electrode containing a composite lithium oxide, a negative electrode capable of absorbing and desorbing lithium ions, a sheet-like separator interposed between the positive electrode and the negative electrode, a non-aqueous electrolyte and a porous electron-insulating film attached to the surface of the negative electrode, wherein the sheet-like separator is a monolayer film made of polypropylene resin or a multilayer film whose layer to be in contact with the positive electrode is made of polypropylene resin, the porous electron-insulating film comprises an inorganic oxide filler and a binder, and the sheet-like separator has a thickness not less than 1.5 times the thickness of the porous electron-insulating film, preferably a thickness 1.5 to 5 times the thickness of the porous electron-insulating film.

The porous electron-insulating film preferably has a thickness of not less than 1 μm, more preferably 2 to 8 μm.

The total thickness of the sheet-like separator and the porous electron-insulating film is preferably not less than 15 μm and not greater than 30 μm, more preferably 15 to 20 μm.

The present invention further relates to a method for charging the lithium ion secondary battery described above, wherein the battery is charged to a voltage of not less than 4.3 V, specifically, not less than 4.4 V, not less than 4.5 V, or not less than 4.6 V.

The present invention further relates to a method for charging the lithium ion secondary battery described above, wherein the battery is charged by a charger whose end-of-charge voltage is set to not less than 4.3 V, specifically, not less than 4.4 V, not less than 4.5 V, or not less than 4.6 V.

The present invention further relates to a charge control system of a lithium ion secondary battery comprising the lithium ion secondary battery described above and a charger whose end-of-charge voltage is set to not less than 4.3 V, specifically, not less than 4.4 V, not less than 4.5 V, or not less than 4.6 V.

The present invention further relates to a charge/discharge control system for controlling the lithium ion secondary battery described above to be within a predetermined voltage range, wherein the upper limit of the predetermined voltage range is set to not less than 4.3 V, specifically, not less than 4.4 V, not less than 4.5 V, or not less than 4.6 V.

In the present invention, because the sheet-like separator is a monolayer film made of polypropylene resin or a multilayer film whose layer to be in contact with the positive electrode is made of polypropylene resin, even when the lithium ion secondary battery charged to a high voltage of not less than 4.3 V is kept at a high temperature for a long period of time, the capacity decrease can be suppressed. Further, because the sheet-like separator with excellent elasticity has a thickness not less than 1.5 times the thickness of the porous electron-insulating film attached to the surface of the negative electrode, the separation of the active material from the negative electrode current collector resulting from poor elasticity of the porous electron-insulating film can be prevented. In addition, the retention of electrolyte in the negative electrode can be sufficiently ensured all the time even during a charge/discharge cycle causing large expansion and contraction of the electrode group. Accordingly, it is possible to provide a lithium ion secondary battery having excellent charge/discharge cycle life characteristics, particularly, excellent high voltage charge/discharge cycle life characteristics when the battery is charged to a voltage of not less than 4.3 V.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention relates to a lithium ion secondary battery. More particularly, the invention relates to a technique for suppressing the capacity decrease when the charged lithium ion secondary battery is kept at a high temperature for a long period of time and for improving the charge/discharge cycle life characteristics of the lithium ion secondary battery, particularly, the high voltage charge/discharge cycle life characteristics when the battery is charged to a voltage of not less than 4.3 V.

The present invention relates to a lithium ion secondary battery comprising a positive electrode containing a composite lithium oxide, a negative electrode capable of absorbing and desorbing lithium ions, a sheet-like separator interposed between the positive electrode and the negative electrode, a non-aqueous electrolyte and a porous electron-insulating film attached to the surface of the negative electrode.

The form of the battery is not specifically limited. The most widely used are cylindrical or prismatic batteries with an electrode group constructed by spirally winding a strip-shaped positive electrode and a strip-shaped negative electrode with a sheet-like separator interposed therebetween, and cylindrical or prismatic batteries with an electrode group constructed by stacking a plurality of sheet-like positive and negative electrodes. The present invention is also applicable to a thin battery or coin type battery comprising a pair of a positive electrode and a negative electrode.

The sheet-like separator is usually produced by drawing a resin sheet obtained by extrusion or the like, and it is in the form of a microporous film. As such, the sheet-like separator has a relatively high tensile strength in the surface direction, but it is heat-shrinkable at a high temperature.

The porous electron-insulating film (layer) has a function similar to the sheet-like separator, but the structure thereof differs significantly from that of the sheet-like separator. The porous electron-insulating film has a structure in which the particles of an inorganic oxide filler are bonded by a binder. As such, the porous electron-insulating film has a lower tensile strength in the surface direction than that of the sheet-like separator. However, the porous electron-insulating film does not heat-shrink like the sheet-like separator does even when it is exposed to high temperatures. Accordingly, the porous electron-insulating film has the action of preventing the spread of an internal short-circuit when the short-circuit occurs and the action of preventing abnormal heating so as to enhance the safety of the secondary battery.

Similar to the sheet-like separator, the porous electron-insulating film is placed between the positive electrode and the negative electrode, and it is attached to the surface of the negative electrode. As such, in the case of a spirally-wound battery, for example, the porous electron-insulating film is formed on both surfaces of the negative electrode. In the case of a coin type battery, the porous electron-insulating film is formed on the surface of the negative electrode to be opposed to the positive electrode.

In the present invention, the sheet-like separator is a monolayer film made of polypropylene resin or a multilayer film including a layer made of polypropylene resin. When the multilayer film including a layer made of polypropylene resin is used, the layer made of polypropylene resin should be placed such that it faces the positive electrode. For this reason, at least one of the outermost layers of the sheet-like separator should be the layer made of polypropylene resin.

The capacity decrease of the battery charged to a high voltage and kept at a high temperature for a long period of time is believed to occur by the following mechanism. First, the oxygen released from the positive electrode active material (i.e. composite lithium oxide) reacts with the protons released by the oxidation of the sheet-like separator to produce $H_2O$. Subsequently, the produced $H_2O$ reacts with the electrolyte to form a film of $LiF$, $Li_2CO_3$, $Li_2O$ or the like on the surface of the negative electrode active material. As a result, the absorption and desorption of lithium ions by the negative electrode active material is inhibited, decreasing the discharge capacity. When the surface of the sheet-like separator to be in contact with the positive electrode is a monolayer film made of polypropylene resin or a layer made of polypropylene resin, on the other hand, it is known that the oxidation of the separator is inhibited. Accordingly, in order to repeat the charge/discharge cycle where the battery is charged to a high voltage, the sheet-like separator should be a monolayer film made of polypropylene resin, or a multilayer film in which the layer to be in contact with the positive electrode is made of polypropylene resin.

The monolayer film made of polypropylene resin and the layer of the multilayer film made of polypropylene resin to be in contact with the positive electrode may comprise a polypropylene resin only, or a polypropylene resin and a component other than polypropylene resin. Examples of the component other than polypropylene resin include a resin such as polyethylene and a filler such as inorganic particles. When the sheet-like separator contains inorganic particles, the resin preferably accounts for 70 wt % or more of all the constituting materials of the sheet-like separator.

In the monolayer film made of polypropylene resin or the layer of the multilayer film made of polypropylene resin to be in contact with the positive electrode, polypropylene resin preferably accounts for not less than 60 wt % of the resin component.

In the multilayer film including a layer made of polypropylene resin, the layer made of polypropylene resin to be in contact with the positive electrode preferably has a thickness not less than 10% of the total thickness of the multilayer film. The layers other than the layer made of polypropylene preferably comprise polyethylene, but not limited thereto.

The porous electron-insulating film comprises an inorganic oxide filler and a binder (hereinafter referred to as "filler binder"). The porous electron-insulating film is typically formed by applying, onto the surface of the negative electrode, a raw material slurry prepared by mixing an inorganic oxide filler and a filler binder with a liquid component, followed by drying. The application of the raw material slurry for the porous electron-insulating film is performed by die nozzle method, blade method or the like. The liquid component is not specifically limited because it can be appropriately selected according to the type of the inorganic oxide filler and/or the type of the filler binder. Examples thereof include water, N-methyl-2-pyrrolidone (NMP), acetone, hexane and cyclohexanone.

In the porous electron-insulating film, the filler binder preferably accounts for 2 to 10 wt % of the total amount of the inorganic oxide filler and the filler binder, more preferably 2 to 6 wt % of the total amount of the same.

The sheet-like separator preferably has a thickness not less than 1.5 times the thickness of the porous electron-insulating film, more preferably a thickness 1.5 to 5 times the thickness of the same. As described earlier, in the lithium ion secondary battery, both the positive electrode and the negative electrode expand and contract during charge and discharge. Because the porous electron-insulating film attached to the surface of the negative electrode is mainly made of rigid inorganic filler and has poor elasticity, it cannot follow such expansion and contraction, causing the separation of the negative electrode active material from the current collector. The sheet-like separator, on the other hand, can expand and contract to some extent and is highly flexible. Hence, when the porous electron-insulating film and the sheet-like separator having a thickness not less than 1.5 times the thickness of the porous electron-insulating film are used in combination, the sheet-like separator functions as a cushion, and the separation of the active material from the current collector is effectively prevented.

Moreover, the sheet-like separator having a thickness not less than 1.5 times the thickness of the porous electron-insulating film can retain a sufficient amount of electrolyte, and therefore the electrolyte is sufficiently supplied to the negative electrode even when the negative electrode repeatedly expands and contracts to a great degree, achieving an improvement in the charge/discharge cycle life characteristics at the same time. This improvement effect is particularly remarkable in the charge/discharge cycles where the battery is charged to a high voltage. When the thickness of the sheet-like separator is less than 1.5 times the thickness of the porous electron-insulating film, sufficient charge/discharge cycle life characteristics cannot be obtained.

In order to ensure a sufficient amount of electrolyte in the negative electrode, the porous electron-insulating film to be attached to the surface of the negative electrode preferably has a thickness of not less than 1 µm. From the standpoint of obtaining excellent charge/discharge cycle life characteristics when the battery is charged to a higher voltage, the thickness is preferably 2 to 8 µm.

The thickness of the sheet-like separator is not specifically limited as long as the sheet-like separator has a thickness not less than 1.5 times the thickness of the porous electron-insulating film. However, in order to ensure a sufficient amount of electrolyte between the positive electrode and the negative electrode, to maintain the designed capacity of the battery and to obtain excellent discharge rate characteristics, the thickness is preferably 10 to 25 µm. When the sheet-like separator is a multilayer film, the thickness of each layer is not specifically limited, but the layer made of polypropylene resin to be in contact with the positive electrode is preferably not less than 1 µm, more preferably not less than 2.5 µm.

In order to ensure a sufficient amount of electrolyte between the positive electrode and the negative electrode, to maintain the designed capacity of the battery and to obtain excellent discharge rate characteristics, the total thickness of the sheet-like separator and the porous electron-insulating film is preferably not less than 15 µm and not greater than 30 µm, more preferably 15 to 20 µm.

As the oxide for constituting the inorganic oxide filler to be contained in the porous electron-insulating film, aluminum oxide ($Al_2O_3$), titanium oxide ($TiO_2$), silicon oxide ($SiO_2$), magnesium oxide (MgO), zirconium oxide($ZrO_2$), tungsten oxide($WO_2$, $WO_3$) and the like can be used. They may be used singly or in any combination of two or more. Among them, in particular, aluminum oxide is preferred in terms of reduction resistance, specifically, α-alumina.

The average particle size of the inorganic oxide filler is not specifically limited because it can be appropriately selected according to the thickness or the like of the porous electron-insulating film. For example, when the average particle size is determined by a wet-type laser particle distribution analyzer manufactured by Microtrac Inc., a volume or weight based average particle size (median value: $D_{50}$) of about 0.3 to 1 µm is preferred.

Examples of the filler binder include, but not limited to, polyacrylic acid derivatives, polyacrylonitrile derivatives, rubber polymers containing an acrylonitrile unit, fluorocarbon resin such as polyvinylidene fluoride (PVDF), polyethylene and styrene butadiene rubber. They may be used singly or in any combination of two or more. Among them, preferred are polyacrylic acid derivatives and polyacrylonitrile derivatives. These derivatives preferably contain an acrylate unit or a methacrylate unit. Examples of the acrylate unit include methyl acrylate and ethyl acrylate. Examples of the methacrylate include methyl methacrylate and ethyl methacrylate.

The positive electrode of the lithium ion secondary battery of the present invention contains at least a composite lithium oxide as the positive electrode active material, and optionally a positive electrode binder and a conductive material. The positive electrode to be spirally wound comprises a strip-shaped positive electrode current collector having positive electrode active material layers formed on both surfaces thereof. The positive electrode is usually produced by applying, onto both surfaces of a strip-shaped positive electrode current collector, a positive electrode material mixture slurry prepared by mixing a positive electrode active material, a positive electrode binder and a conductive material with a liquid component such as N-methyl-2-pyrrolidone, followed by drying. As the positive electrode current collector, a metal foil such as aluminum foil is preferably used.

Examples of the composite lithium oxide that can be used as the positive electrode active material include lithium cobalt oxide, modified forms of lithium cobalt oxide, lithium nickel oxide, modified forms of lithium nickel oxide, lithium manganese oxide and modified forms of lithium manganese oxide. The modified forms of the oxides can be prepared by replacing a part of the transition metal with other element, for example, aluminum or magnesium. Further, a composite lithium oxide containing at least two elements selected from cobalt, nickel and manganese is also preferred for use. They may be used singly or in any combination of two or more.

When the battery is put through the repeated charge/discharge cycle where the battery is charged to a high voltage, an oxide represented by the general formula (1): $Li_xMe_{1-y-z}M_yL_zO_2$ is preferably used as the composite lithium oxide.

In the general formula (1), Me is at least one transition metal element except Ti, Mn, Y and Zn; M is at least one metal element selected from the group consisting of Mg, Ti, Mn and Zn; L is at least one element selected from the group consisting of Al, Ca, Ba, Sr, Y and Zr; x satisfies $1 \leq x \leq 1.05$; y satisfies $0.005 \leq y \leq 0.1$ (in the case of M being Mn, $0.005 \leq y \leq 0.5$); and z satisfies $0 \leq z \leq 0.05$. Further, in the case where the M is a combination of Mn and at least one selected from the group consisting of Mg, Ti and Zn, preferably, y satisfies $0.005 \leq y \leq 0.5$, and at least one selected from the group consisting of Mg, Ti and Zn accounts for a share of not greater than 0.1.

In the formula (1), it is surmised that M stabilizes the crystal of $Li_xMeO_2$ in the state of a high potential when $x \leq 0.5$. It is also surmised that L exists in the crystal and contributes to the stabilization of the crystal. In addition, a part of L exists on the surface of the active material particles in the form of an oxide, carbonate or hydroxide to prevent the reaction between the electrolyte and the active material. The oxide represented by the general formula (1) may be used singly or in any combination of two or more.

When the battery is put through the repeated charge/discharge cycle where the battery is charged to a high voltage, it is also preferable to use an oxide represented by the general formula (2): $Li_xNi_{1-y-z}Mn_yCo_zO_2$ or the general formula (3): $Li_x[Ni_{1-y}Mn_y]_zO_4$.

In the general formula (2), $0.95 \leq x \leq 1.05$, $3/10 \leq y \leq 1/3$, and $2/10 \leq z \leq 1/3$.

In the general formula (3), $0.95 \leq x \leq 1.05$, $0.7 \leq y \leq 0.8$, and $1.95 \leq z \leq 2.05$.

The positive electrode binder is not specifically limited, and examples thereof include polytetrafluoroethylene (PTFE), modified acrylonitrile rubber particles and polyvinylidene fluoride (PVDF). They may be used singly or in any appropriate combination. For example, PTFE and modified acrylonitrile rubber particles are preferably combined with carboxymethyl cellulose, polyethylene oxide or modified acrylonitrile rubber which serves as a thickener for the positive electrode material mixture slurry. PVDF is preferably used singly.

Examples of the conductive material include acetylene black, Ketjen black (registered trade name) and various graphites. They may be used singly or in any combination of two or more.

The negative electrode of the lithium ion secondary battery of the present invention contains at least a negative electrode active material, optionally a negative electrode binder and a conductive material. The negative electrode to be spirally wound comprises a strip-shaped negative electrode current collector having negative electrode active material layers formed on both surfaces thereof. The negative electrode is usually produced by applying, onto both surfaces of a strip-shaped negative electrode current collector, a negative electrode material mixture slurry prepared by mixing a negative electrode active material and a negative electrode binder with a liquid component such as N-methyl-2-pyrrolidone or water, followed by drying. As the negative electrode current collector, a metal foil such as copper foil is preferably used.

Examples of the negative electrode active material include various natural graphites, various artificial graphites, silicon-containing composite materials such as silicide and various alloy materials. They may be used singly or in any combination of two or more. As the negative electrode binder, resin materials that can be used as the positive electrode binder, styrene butadiene rubber and modified styrene butadiene rubber are preferably used.

The non-aqueous electrolyte is preferably prepared by dissolving a lithium salt in a non-aqueous solvent. The non-aqueous solvent is not specifically limited, and examples thereof include carbonic acid esters such as ethylene carbonate (EC), propylene carbonate (PC), dimethyl carbonate (DMC), diethyl carbonate (DEC) and ethyl methyl carbonate (EMC); carboxylic acid esters such as γ-butyrolactone, γ-valerolactone, methyl formate, methyl acetate and methyl propionate; and ethers such as dimethyl ether, diethyl ether and tetrahydrofuran. The non-aqueous solvent may be used singly or in any combination of two or more. Among them, particularly preferred are carbonic acid esters.

The lithium salt is not specifically limited. For example, $LiPF_6$ and $LiBF_4$ are preferably used. They may be used singly or in combination.

In order to ensure the stability during overcharge, it is preferred that the non-aqueous electrolyte further contain a small amount of an additive for forming an appropriate film on the positive electrode and/or the negative electrode: namely, vinylene carbonate (VC), vinyl ethylene carbonate (VEC) or cyclohexylbenzene (CHB).

The lithium ion secondary battery of the present invention is suitable for the application where the battery is charged to a high voltage of not less than 4.3 V. Accordingly, the lithium ion secondary battery of the present invention can be charged by a charger whose end-of-charge voltage is constantly set to not less than 4.3 V. For this reason, the lithium ion secondary battery of the present invention has a higher utilization rate of the positive electrode active material than a conventional lithium ion secondary battery, and thus it is possible to obtain a high capacity.

The present invention will be described below in further detail with reference to examples using a 18650 type cylindrical lithium ion secondary battery having a diameter of 18 mm and a height of 65 mm. However, it should be understood that the scope of the present invention is not limited thereto.

Note that, in the following examples, because the thicknesses of various components are varied, the designed capacities were slightly adjusted such that the electrode group could be housed in the battery case.

Example 1

(a) Production of Positive Electrode

A positive electrode material mixture slurry was prepared by mixing, in a double blade mixer, 3 kg of lithium cobalt oxide ($LiCoO_2$: positive electrode active material), 1 kg of #1320 manufactured by Kureha Chemical Industry Co., Ltd (NMP solution containing 12 wt % PVDF (positive electrode binder)), 90 g of acetylene black (conductive material) and an appropriate amount of NMP. The prepared slurry was then applied onto both surfaces of an aluminum foil (positive electrode current collector) having a thickness of 15 µm, followed by drying and rolling to form positive electrode active material layers. The total thickness of the aluminum foil and the active material layers formed on the both surfaces was 160 µm. The obtained electrode plate was then cut into a size suitable for the battery case for 18650 type cylindrical battery to give a positive electrode.

(b) Production of Negative Electrode

A negative electrode material mixture slurry was prepared by mixing, in a double blade mixer, 3 kg of artificial graphite (negative electrode active material), 75 g of BM-400B manufactured by Zeon Corporation, Japan (aqueous dispersion containing 40 wt % modified styrene butadiene rubber (negative electrode binder)), 30 g of carboxymethylcellulose (thickener) and an appropriate amount of water. The prepared slurry was then applied onto both surfaces of a copper foil (negative electrode current collector) having a thickness of 10 µm, followed by drying and rolling to form negative electrode active material layers. The total thickness of the copper foil and the active material layers formed on the both surfaces was 180 µm. The obtained electrode plate was then cut into a size suitable for the battery case for 18650 type cylindrical battery to give a negative electrode.

(c) Formation of Porous Electron-Insulating Film

A raw material slurry for the porous electron-insulating film was prepared by mixing, in a double blade mixer, 950 g of aluminum oxide having an average particle size (median size: $D_{50}$) of 0.3 µm (inorganic oxide filler), 625 g of BM-720H manufactured by Zeon Corporation, Japan (NMP solution containing 8 wt % modified acrylonitrile rubber (filler binder)) and an appropriate amount of NMP. The prepared slurry was then applied onto both surfaces of the negative electrode, followed by drying to form porous electron-insulating films each having a thickness of 0.5 µm.

(d) Preparation of Non-Aqueous Electrolyte

Lithium Hexafluorophosphate ($LiPF_6$) was dissolved in a solvent mixture of ethylene carbonate and methyl ethyl carbonate at volume ratio of 1:3 at a $LiPF_6$ concentration of 1 mol/L to give a non-aqueous electrolyte.

(e) Assembly of Battery

Figure 1:
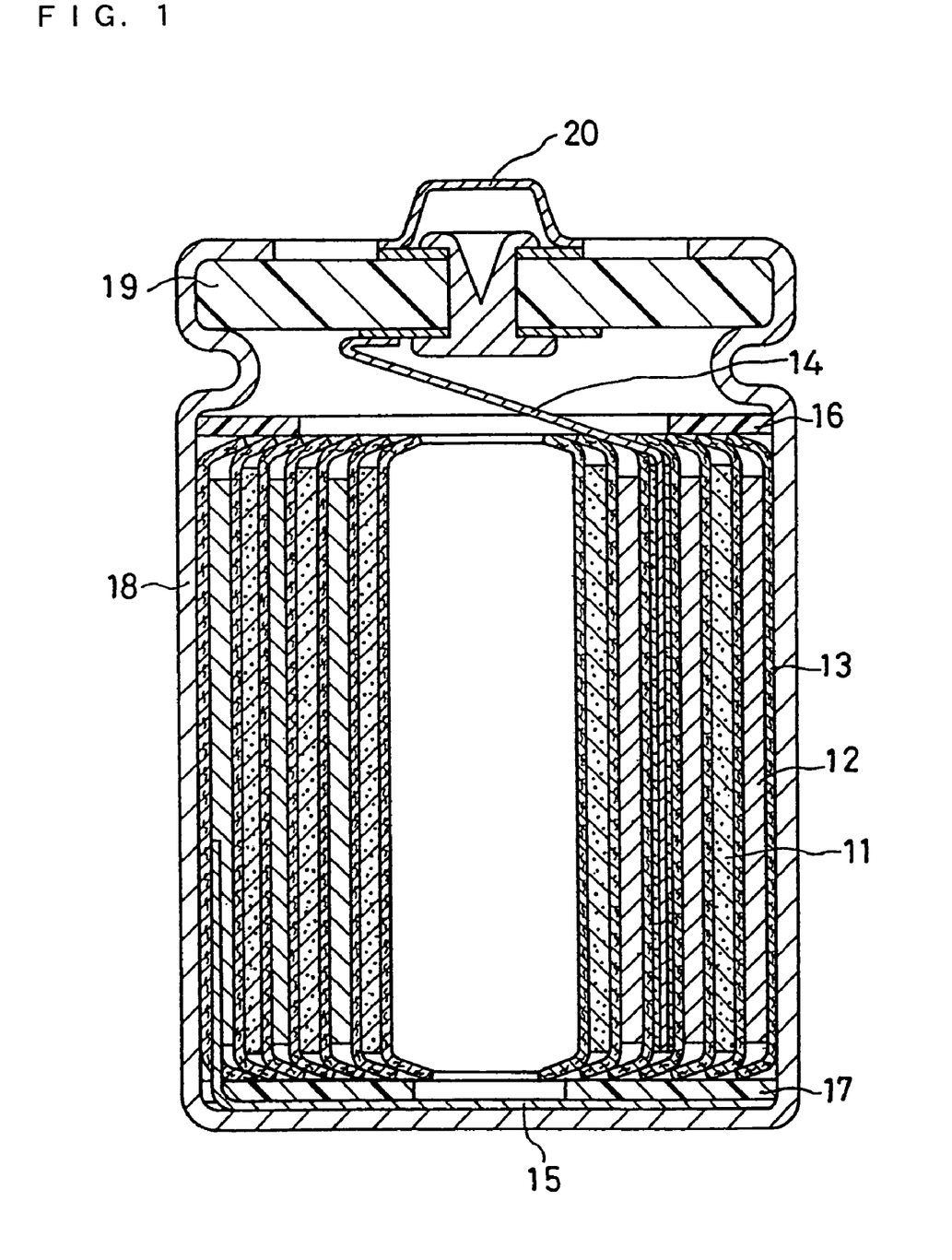
FIG. 1 is a vertical cross sectional view of a cylindrical lithium ion secondary battery according to an example of the present invention.

As shown in FIG. 1, the positive electrode 11 and the negative electrode 12 having 0.5 µm thick porous electron-insulating films (not shown in the drawing) formed on both surfaces thereof produced above were spirally wound with a 10 µm thick sheet-like separator 13 comprising a monolayer film made of polypropylene resin to give an electrode group.

To the positive electrode 11 and the negative electrode 12 were attached a positive electrode lead 14 made of nickel and a negative electrode lead 15 made of nickel, respectively. An upper insulating plate 16 was placed on the top of the electrode group, and a lower insulating plate 17 was placed on the bottom of the electrode group. The electrode group was then inserted in a battery case 18, after which the non-aqueous electrolyte was injected thereto in an amount of 5.5 g. The positive electrode terminal 20 of a sealing plate 19 for sealing the opening of the battery case 18 was electrically connected to the positive electrode lead 14. Finally, the opening was sealed to give a cylindrical lithium ion secondary battery.

Note that, although the monolayer film made of polypropylene resin might have contained a trace amount of additives, it was deemed that it was made of substantially 100% polypropylene resin. The same applies to the monolayer films of polypropylene resin used in the following examples and comparative examples.

Comparative Example 1

A battery was produced in the same manner as in EXAMPLE 1 except that the porous electron-insulating films were not formed on both surfaces of the negative electrode, and that a 25 µm thick monolayer film made of polypropylene resin was used as the sheet-like separator.

Comparative Example 2

A battery was produced in the same manner as in EXAMPLE 1 except that porous electron-insulating films each having a thickness of 5 µm were formed on both surfaces of the negative electrode, and that a 20 µm thick monolayer film made of polyethylene resin was used as the sheet-like separator. Note that, although the monolayer film made of polyethylene resin might have contained a trace amount of additives, it was deemed that it was made of substantially 100% polyethylene resin.

Comparative Example 3

A battery was produced in the same manner as in EXAMPLE 1 except that porous electron-insulating films each having a thickness of 5 µm were formed on both surfaces of the negative electrode, that a double-layer film comprising a 10 µm thick layer made of polypropylene resin and a 10 µm thick layer made of polyethylene resin was used as the sheet-like separator, and that the electrode group was constructed such that the layer made of polyethylene resin was in contact with the positive electrode. Note that, although the layer made of polypropylene resin and the layer made of polyethylene resin each might have contained a trace amount of additives, it was deemed that they were made of substantially 100% polypropylene resin and substantially 100% polyethylene resin, respectively.

Comparative Example 4

A battery was produced in the same manner as in EXAMPLE 1 except that, instead of forming the porous electron-insulating film on both surfaces of the negative electrode, porous electron-insulating films each having a thickness of 5 µm were formed on both surfaces of the positive electrode, and that a 20 μm thick monolayer film made of polypropylene resin was used as the sheet-like separator.

Example 2

A battery was produced in the same manner as in EXAMPLE 1 except that porous electron-insulating films each having a thickness of 1 μm were formed on both surfaces of the negative electrode.

Example 3

A battery was produced in the same manner as in EXAMPLE 1 except that porous electron-insulating films each having a thickness of 5 μm were formed on both surfaces of the negative electrode.

Comparative Example 5

A battery was produced in the same manner as in EXAMPLE 1 except that porous electron-insulating films each having a thickness of 10 μm were formed on both surfaces of the negative electrode.

Comparative Example 6

A battery was produced in the same manner as in EXAMPLE 1 except that porous electron-insulating films each having a thickness of 20 μm were formed on both surfaces of the negative electrode.

Example 4

A battery was produced in the same manner as in EXAMPLE 1 except that a 15 μm thick monolayer film made of polypropylene resin was used as the sheet-like separator.

Example 5

A battery was produced in the same manner as in EXAMPLE 4 except that porous electron-insulating films each having a thickness of 1 μm were formed on both surfaces of the negative electrode.

Example 6

A battery was produced in the same manner as in EXAMPLE 4 except that porous electron-insulating films each having a thickness of 5 μm were formed on both surfaces of the negative electrode.

Example 7

A battery was produced in the same manner as in EXAMPLE 4 except that porous electron-insulating films each having a thickness of 10 μm were formed on both surfaces of the negative electrode.

Comparative Example 7

A battery was produced in the same manner as in EXAMPLE 4 except that porous electron-insulating films each having a thickness of 20 μm were formed on both surfaces of the negative electrode.

Example 8

A battery was produced in the same manner as in EXAMPLE 1 except that a 20 μm thick monolayer film made of polypropylene resin was used as the sheet-like separator.

Example 9

A battery was produced in the same manner as in EXAMPLE 8 except that porous electron-insulating films each having a thickness of 1 μm were formed on both surfaces of the negative electrode.

Example 10

A battery was produced in the same manner as in EXAMPLE 8 except that porous electron-insulating films each having a thickness of 5 μm were formed on both surfaces of the negative electrode.

Example 11

A battery was produced in the same manner as in EXAMPLE 8 except that porous electron-insulating films each having a thickness of 10 μm were formed on both surfaces of the negative electrode.

Comparative Example 8

A battery was produced in the same manner as in EXAMPLE 8 except that porous electron-insulating films each having a thickness of 20 μm were formed on both surfaces of the negative electrode.

Example 12

A battery was produced in the same manner as in EXAMPLE 1 except that a 25 μm thick monolayer film made of polypropylene resin was used as the sheet-like separator.

Example 13

A battery was produced in the same manner as in EXAMPLE 12 except that porous electron-insulating films each having a thickness of 1 μm were formed on both surfaces of the negative electrode.

Example 14

A battery was produced in the same manner as in EXAMPLE 12 except that porous electron-insulating films each having a thickness of 5 μm were formed on both surfaces of the negative electrode.

Example 15

A battery was produced in the same manner as in EXAMPLE 12 except that porous electron-insulating films each having a thickness of 10 μm were formed on both surfaces of the negative electrode.

Comparative Example 9

A battery was produced in the same manner as in EXAMPLE 12 except that porous electron-insulating films each having a thickness of 20 μm were formed on both surfaces of the negative electrode.

Example 16

A battery was produced in the same manner as in EXAMPLE 1 except that porous electron-insulating films each having a thickness of 5 μm were formed on both surfaces of the negative electrode, that a double-layer film comprising a 10 μm thick layer made of polypropylene resin and a 10 μm thick layer made of polyethylene resin was used as the sheet-like separator, and that the electrode group was constructed such that the layer made of polypropylene resin was in contact with the positive electrode. Note that, although the layer made of polypropylene resin and the layer made of polyethylene resin each might have contained a trace amount of additives, it was deemed that they were made of substantially 100% polypropylene resin and substantially 100% polyethylene resin, respectively.

Example 17

Two solid solution hydroxides comprising nickel, manganese and cobalt at different molar ratios (1:1:1 and 5:3:2) were prepared by coprecipitation method. Each hydroxide was mixed with lithium carbonate such that the molar ratio of the total of nickel, manganese and cobalt to lithium was 1:1. The obtained mixtures were then baked at 900° C. for 10 hours to give two lithium-containing transition metal oxides, namely, $LiNi_{1/3}Mn_{1/3}Co_{1/3}O_2$ and $LiNi_{5/10}Mn_{3/10}Co_{2/10}O_2$. Two positive electrodes were produced in the same manner as in EXAMPLE 1 except that these lithium-containing transition metal oxides were used as the positive electrode active material instead of $LiCoO_2$.

Further, two batteries were constructed in the same manner as in EXAMPLE 6 except that the obtained positive electrodes were used.

Example 18

Three solid solution hydroxides comprising nickel and manganese at different molar ratios (2:8, 1:3 and 3:7) were prepared by coprecipitation method. Each hydroxide was mixed with lithium carbonate such that the molar ratio of the total of nickel and manganese to lithium was 2:1. The obtained mixtures were then baked at 950° C. for 10 hours to give three lithium-containing transition metal oxides (spinel compounds), namely, $Li[Ni_{0.2}Mn_{0.8}]_2O_4$, $Li[Ni_{0.25}Mn_{0.75}]_2O_4$ and $Li[Ni_{0.3}Mn_{0.7}]_2O_4$). Three positive electrodes were produced in the same manner as in EXAMPLE 1 except that these spinel compounds were used as the positive electrode active material instead of $LiCoO_2$.

Further, three batteries were constructed in the same manner as in EXAMPLE 6 except that the obtained positive electrodes were used.

Comparative Example 10

Three batteries were produced in the same manner as in EXAMPLE 18 except that porous electron-insulating films each having a thickness of 20 μm were formed on both surfaces of the negative electrode, and that a 10 μm thick monolayer film made of polypropylene resin was used as the sheet-like separator.

The main compositions of the batteries constructed in EXAMPLEs and COMPARATIVE EXAMPLEs are shown in Tables 1 and 2.

TABLE 1

|  | Thickness of porous electron-insulating film on negative electrode surface: A (μm) | Sheet-like separator | Thickness of sheet-like separator: B (μm) | B/A | A + B (μm) |
|---|---|---|---|---|---|
| Ex. 1 | 0.5 | Polypropylene monolayer | 10 | 20 | 10.5 |
| Ex. 2 | 1 | Polypropylene monolayer | 10 | 10 | 11 |
| Ex. 3 | 5 | Polypropylene monolayer | 10 | 2 | 15 |
| Comp. Ex. 5 | 10 | Polypropylene monolayer | 10 | 1 | 20 |
| Comp. Ex. 6 | 20 | Polypropylene monolayer | 10 | 0.5 | 30 |
| Ex. 4 | 0.5 | Polypropylene monolayer | 15 | 30 | 15.5 |
| Ex. 5 | 1 | Polypropylene monolayer | 15 | 15 | 16 |
| Ex. 6 | 5 | Polypropylene monolayer | 15 | 3 | 20 |
| Ex. 7 | 10 | Polypropylene monolayer | 15 | 1.5 | 25 |
| Comp. Ex. 7 | 20 | Polypropylene monolayer | 15 | 0.75 | 35 |
| Ex. 8 | 0.5 | Polypropylene monolayer | 20 | 40 | 20.5 |
| Ex. 9 | 1 | Polypropylene monolayer | 20 | 20 | 21 |
| Ex. 10 | 5 | Polypropylene monolayer | 20 | 4 | 25 |
| Ex. 11 | 10 | Polypropylene monolayer | 20 | 2 | 30 |
| Comp. Ex. 8 | 20 | Polypropylene monolayer | 20 | 1 | 40 |
| Ex. 12 | 0.5 | Polypropylene monolayer | 25 | 50 | 25.5 |
| Ex. 13 | 1 | Polypropylene monolayer | 25 | 25 | 26 |
| Ex. 14 | 5 | Polypropylene monolayer | 25 | 5 | 30 |
| Ex. 15 | 10 | Polypropylene monolayer | 25 | 2.5 | 35 |
| Comp. Ex. 9 | 20 | Polypropylene monolayer | 25 | 1.3 | 45 |
| Ex. 16 | 5 | Double-layer film of polypropylene layer and polyethylene layer | 20 | 4 | 25 |
| Comp. Ex. 1 | 0 | Polypropylene monolayer | 25 | — | 25 |
| Comp. Ex. 2 | 5 | Polyethylene monolayer | 20 | 4 | 25 |
| Comp. Ex. 3 | 5 | Double-layer film of polypropylene layer and polyethylene layer | 20 | 4 | 25 |
| Comp. Ex. 4 | 0 | Polypropylene monolayer | 20 | 4 | 25 |

TABLE 2

|  | Positive electrode active material | Thickness of porous electron-insulating film on negative electrode surface: A (μm) | Sheet-like separator | Thickness of sheet-like separator: B (μm) | B/A | A + B (μm) |
|---|---|---|---|---|---|---|
| Ex. 17 | $LiNi_{1/3}Mn_{1/3}Co_{1/3}O_2$ | 5 | Polypropylene monolayer | 15 | 3 | 20 |
|  | $LiNi_{5/10}Mn_{3/10}Co_{2/10}O_2$ | 5 | Polypropylene monolayer | 15 | 3 | 20 |
| Ex. 18 | $Li[Ni_{0.2}Mn_{0.8}]_2O_4$ | 5 | Polypropylene monolayer | 15 | 3 | 20 |
|  | $Li[Ni_{0.25}Mn_{0.75}]_2O_4$ | 5 | Polypropylene monolayer | 15 | 3 | 20 |
|  | $Li[Ni_{0.3}Mn_{0.7}]_2O_4$ | 5 | Polypropylene monolayer | 15 | 3 | 20 |
| Comp. Ex. 10 | $Li[Ni_{0.2}Mn_{0.8}]_2O_4$ | 20 | Polypropylene monolayer | 10 | 0.5 | 30 |
|  | $Li[Ni_{0.25}Mn_{0.75}]_2O_4$ | 20 | Polypropylene monolayer | 10 | 0.5 | 30 |
|  | $Li[Ni_{0.3}Mn_{0.7}]_2O_4$ | 20 | Polypropylene monolayer | 10 | 0.5 | 30 |

[Evaluation]

(i) Evaluation on Examples 1 to 17 and Comparative Examples 1 to 9

The produced batteries were subjected to the following four tests:
 Discharge rate characteristics test;
 Charge storage test (storage test in the case where the fully charged battery was kept at a high temperature);
 Charge/discharge cycle life test; and
 High voltage charge/discharge cycle life test (charge/discharge cycle life test in which the battery was charged to a voltage of 4.3 or 4.35 V).

<Discharge Rate Characteristics Test>

Each battery was first charged and discharged by the following pattern, which was then stored in an atmosphere of 45° C. for 7 days.
 1. Constant current charge: 400 mA (end voltage 4.0 V)
 2. Constant current discharge: 400 mA (end voltage 3 V)
 3. Constant current charge: 400 mA (end voltage 4.0 V)
 4. Constant current discharge: 400 mA (end voltage 3 V)
 5. Constant current charge: 400 mA (end voltage 4.0 V)

Thereafter, each battery was charged and discharged in an atmosphere of 20° C. by the following pattern.

(1) Pre-Discharge
 Constant current discharge: 400 mA (end voltage 3 V)

(2) First Pattern
 Constant current charge: 1400 mA (end voltage 4.2 V)
 Constant voltage charge: 4.2 V (end current 100 mA)
 Constant current discharge: 400 mA (end voltage 3 V)

(3) Second Pattern
 Constant current charge: 1400 mA (end voltage 4.2 V)
 Constant voltage charge: 4.2 V (end current 100 mA)
 Constant current discharge: 4000 mA (end voltage 3 V)

The designed capacity and the capacity ratio of each battery are shown in Tables 3 and 4. The capacity ratio herein means the ratio of the discharge capacity in the second pattern to that in the first pattern expressed in percentage.

<Charge Storage Test>

After the discharge rate characteristics test, each battery was charged as follows.
 Constant current charge: 1400 mA (end voltage 4.2 V)
 Constant voltage charge: 4.2 V (end current 100 mA)

The charged battery was stored in an atmosphere of 60° C. for 30 days, which was then charged and discharged in an atmosphere of 20° C. by the following pattern.

(4) Pre-Discharge
 Constant current discharge: 400 mA (end voltage 3V)

(5) Constant current charge: 1400 mA (end voltage 4.2 V)
 Constant voltage charge: 4.2 V (end current 100 mA)
 Constant current discharge: 400 mA (end voltage 3 V)

The capacity recovery rate after storage was calculated by the following general equation:

Capacity recovery rate (%)={Discharge capacity obtained in (5)/Discharge capacity obtained in (2) of the first pattern}×100. The results are shown in Tables 3 and 4.

<Charge/Discharge Cycle Life Test>

After the discharge rate characteristics test, each battery was repeatedly charged and discharged in an atmosphere of 20° C. by the following pattern.
 Constant current charge: 1400 mA (end voltage 4.2 V)
 Constant voltage charge: 4.2 V (end current 100 mA)
 Constant current discharge: 2000 mA (end voltage 3 V)

The above charge/discharge pattern was repeated 500 times, after which the battery was charged and discharged in an atmosphere of 20° C. by the following pattern.

(6) Constant current charge: 1400 mA (end voltage 4.2 V)
 Constant voltage charge: 4.2 V (end current 100 mA)
 Constant current discharge: 400 mA (end voltage 3 V)

The capacity retention rate was calculated by the following general equation:

Capacity retention rate (%)={Discharge capacity obtained in (6)/Discharge capacity obtained in (2) of the first pattern}×100. The results are shown in Tables 3 and 4.

<4.3 V Charge/Discharge Cycle Life Test>

After the discharge rate characteristics test, each battery was repeatedly charged and discharged in an atmosphere of 45° C. by the following pattern.
 Constant current charge: 1400 mA (end voltage 4.3 V)
 Constant voltage charge: 4.3 V (end current 100 mA)
 Constant current discharge: 2000 mA (end voltage 3 V)

The above charge/discharge pattern was repeated 500 times, after which the battery was charged and discharged in an atmosphere of 20° C. by the following pattern.

(7) Constant current charge: 1400 mA (end voltage 4.2 V)
Constant voltage charge: 4.2 V (end current 100 mA)
Constant current discharge: 400 mA (end voltage 3 V)

The capacity retention rate in the case of charging the battery to 4.3 V (4.3 V charge capacity retention rate) was calculated by the following general equation:

Capacity retention rate (%)={Discharge capacity obtained in (7)/Discharge capacity obtained in (2) of the first pattern}×100. The results are shown in Tables 3 and 4.

<4.35 V Charge/Discharge Cycle Life Test>

After the discharge rate characteristics test, each battery was repeatedly charged and discharged in an atmosphere of 45° C. by the following pattern.

Constant current charge: 1400 mA (end voltage 4.35 V)
Constant voltage charge: 4.35 V (end current 100 mA)
Constant current discharge: 2000 mA (end voltage 3 V)

The above charge/discharge pattern was repeated 500 times, after which the battery was charged and discharged in an atmosphere of 20° C. by the following pattern.

(8) Constant current charge: 1400 mA (end voltage 4.2 V)
Constant voltage charge: 4.2 V (end current 100 mA)
Constant current discharge: 400 mA (end voltage 3 V)

The capacity retention rate in the case of charging the battery to 4.35 V (4.35 V charge capacity retention rate) was calculated by the following general equation:

Capacity retention rate (%)={Discharge capacity obtained in (8)/Discharge capacity obtained in (2) of the first pattern}×100. The results are shown in Tables 3 and 4.

TABLE 3

| | Discharge rate characteristics test | | Charge storage test | Charge/ discharge cycle life test | 4.3 V charge/ discharge cycle life test | 4.35 V charge/ discharge cycle life test |
|---|---|---|---|---|---|---|
| | Designed capacity (mAh) | Capacity ratio (%) | Capacity recovery rate (%) | Capacity retention rate (%) | Capacity retention rate (%) | Capacity retention rate (%) |
| Ex. 1 | 2150 | 95 | 89 | 65 | 55 | 48 |
| Ex. 2 | 2150 | 94 | 90 | 70 | 60 | 53 |
| Ex. 3 | 2100 | 94 | 91 | 80 | 72 | 67 |
| Comp. Ex. 5 | 2000 | 93 | 90 | 64 | 58 | 51 |
| Comp. Ex. 6 | 1850 | 89 | 89 | 60 | 50 | 44 |
| Ex. 4 | 2100 | 93 | 93 | 70 | 61 | 54 |
| Ex. 5 | 2100 | 92 | 92 | 83 | 77 | 70 |
| Ex. 6 | 2000 | 92 | 91 | 88 | 80 | 74 |
| Ex. 7 | 1950 | 91 | 93 | 82 | 76 | 69 |
| Comp. Ex. 7 | 1800 | 80 | 90 | 63 | 52 | 46 |
| Ex. 8 | 2000 | 92 | 91 | 74 | 63 | 54 |
| Ex. 9 | 2000 | 92 | 90 | 85 | 78 | 73 |
| Ex. 10 | 1950 | 91 | 92 | 87 | 80 | 75 |
| Ex. 11 | 1850 | 89 | 91 | 81 | 76 | 70 |
| Comp. Ex. 8 | 1700 | 74 | 88 | 64 | 59 | 50 |
| Ex. 12 | 1950 | 90 | 91 | 73 | 62 | 53 |
| Ex. 13 | 1950 | 89 | 93 | 84 | 74 | 67 |
| Ex. 14 | 1850 | 88 | 90 | 82 | 73 | 68 |
| Ex. 15 | 1800 | 81 | 89 | 80 | 71 | 65 |
| Comp. Ex. 9 | 1650 | 69 | 87 | 62 | 51 | 47 |
| Ex. 16 | 1950 | 91 | 91 | 83 | 79 | 72 |
| Comp. Ex. 1 | 1950 | 91 | 89 | 55 | 52 | 46 |
| Comp. Ex. 2 | 1950 | 90 | 72 | 80 | 32 | 23 |
| Comp. Ex. 3 | 1950 | 90 | 75 | 81 | 35 | 25 |
| Comp. Ex. 4 | 1950 | 89 | 90 | 59 | 51 | 44 |

TABLE 4

| | Discharge rate characteristics test | | Charge storage test | Charge/ discharge cycle life test | 4.3 V charge/ discharge cycle life test | 4.35 V charge/ discharge cycle life test |
|---|---|---|---|---|---|---|
| | Designed capacity (mAh) | Capacity ratio (%) | Capacity recovery rate (%) | Capacity retention rate (%) | Capacity retention rate (%) | Capacity retention rate (%) |
| Ex. 17 | 2000 | 92 | 92 | 90 | 84 | 75 |
| | 2050 | 92 | 92 | 90 | 84 | 75 |

(ii) Evaluation on Example 18 and Comparative Example 10

The batteries produced in EXAMPLE 18 and COMPARATIVE EXAMPLE 10 were subjected to the following three tests:
4.7 V discharge rate characteristics test;
4.7 V charge storage test; and
4.7 V charge/discharge cycle life test.

<4.7 V Discharge Rate Characteristics Test>

Each battery was first charged and discharged by the following pattern, which was then stored in an atmosphere of 45° C. for 7 days.
1. Constant current charge: 400 mA (end voltage 4.6 V)
2. Constant current discharge: 400 mA (end voltage 3 V)
3. Constant current charge: 400 mA (end voltage 4.6 V)
4. Constant current discharge: 400 mA (end voltage 3 V)
5. Constant current charge: 400 mA (end voltage 4.6 V)

Thereafter, each battery was charged and discharged in an atmosphere of 20° C. by the following pattern.

(1) Pre-Discharge
Constant current discharge: 400 mA (end voltage 3 V)

(2) First Pattern
Constant current charge: 1400 mA (end voltage 4.7 V)
Constant voltage charge: 4.7 V (end current 100 mA)
Constant current discharge: 400 mA (end voltage 3 V)

(3) Second Pattern
Constant current charge: 1400 mA (end voltage 4.7 V)
Constant voltage charge: 4.7 V (end current 100 mA)
Constant current discharge: 4000 mA (end voltage 3 V)

The designed capacity and the capacity ratio of each battery are shown in Table 5. The capacity ratio herein means the ratio of the discharge capacity in the second pattern to that in the first pattern expressed in percentage.

<4.7 V Charge Storage Test>

After the 4.7 V discharge rate characteristics test, each battery was charged as follows.
Constant current charge: 1400 mA (end voltage 4.7 V)
Constant voltage charge: 4.7 V (end current 100 mA)

The charged battery was stored in an atmosphere of 60° C. for 30 days, which was then charged and discharged in an atmosphere of 20° C. by the following pattern.

(4) Pre-Discharge
Constant current discharge: 400 mA (end voltage 3V)

(5) Constant current charge: 1400 mA (end voltage 4.7 V)
Constant voltage charge: 4.7 V (end current 100 mA)
Constant current discharge: 400 mA (end voltage 3 V)

The capacity recovery rate after storage was calculated by the following general equation:

Capacity recovery rate (%)={Discharge capacity obtained in (5)/Discharge capacity obtained in (2) of the first pattern}×100. The results are shown in Table 5.

<4.7 V Charge/Discharge Cycle Life Test>

After the 4.7 V discharge rate characteristics test, each battery was repeatedly charged and discharged in an atmosphere of 20° C. by the following pattern.
Constant current charge: 1400 mA (end voltage 4.7 V)
Constant voltage charge: 4.7 V (end current 100 mA)
Constant current discharge: 2000 mA (end voltage 3 V)

The above charge/discharge pattern was repeated 500 times, after which the battery was charged and discharged in an atmosphere of 20° C. by the following pattern.

(6) Constant current charge: 1400 mA (end voltage 4.7 V)
Constant voltage charge: 4.7 V (end current 100 mA)
Constant current discharge: 400 mA (end voltage 3 V)

The capacity retention rate was calculated by the following general equation:

Capacity retention rate (%)={Discharge capacity obtained in (6)/Discharge capacity obtained in (2) of the first pattern}×100. The results are shown in Table 5.

TABLE 5

| | | 4.7 V discharge rate characteristics test | | 4.7 V charge storage test | 4.7 V charge/ discharge cycle life test |
|---|---|---|---|---|---|
| | | Designed capacity (mAh) | Capacity ratio (%) | Capacity recovery rate (%) | Capacity retention rate (%) |
| Ex. 18 | | 2000 | 92 | 90 | 85 |
| | | 2000 | 92 | 90 | 85 |
| | | 2000 | 92 | 90 | 85 |
| Comp. Ex. 10 | | 1850 | 89 | 89 | 40 |
| | | 1850 | 89 | 89 | 40 |
| | | 1850 | 89 | 89 | 40 |

[Analysis]

First, the charge/discharge cycle life characteristics were analyzed.

In the batteries of EXAMPLEs 1 to 18 and those of COMPARATIVE EXAMPLEs 2, 3 and 5 to 9 having porous electron-formed insulting films formed on the surfaces of the negative electrode, the charge/discharge cycle life characteristics were improved, compared to the battery of COMPARATIVE EXAMPLE 1 having no porous electron-insulating film and the battery of COMPARATIVE EXAMPLE 4 having porous electron-insulating films formed on only the surfaces of the positive electrode.

Presumably, this is because the electrolyte was retained in the pores of the porous electron-insulating films formed on the surfaces of the negative electrode, and therefore the retention of electrolyte by the negative electrode was increased. In the battery of COMPARATIVE EXAMPLE 4 having porous electron-insulating films formed on the surfaces of the positive electrode, the effect of increasing the charge/discharge cycle life characteristics was small, which indicates that the effect can be increased by ensuring the retention of electrolyte in the negative electrode that expands and contracts to a great extent.

In the batteries of EXAMPLEs 1, 4, 8 and 12 having porous electron-insulating films each with a thickness of 0.5 μm formed on the surfaces of the negative electrode, the effect of improving the charge/discharge cycle life characteristics were small, which indicates that, in order to increase the retention of electrolyte in the negative electrode, it is preferred to form a porous electron-insulating film having a thickness of not less than 1 μm on the surface of the negative electrode.

However, even when a porous electron-insulating film having a thickness of not less than 1 μm was formed on the surface of the negative electrode, if the sheet-like separator had a thickness less than 1.5 times the thickness of the porous electron-insulating film, like the batteries of COMPARATIVE EXAMPLEs 5 to 9, the effect of increasing the charge/discharge cycle life characteristics was small.

Presumably, this is because the porous electron-insulating films contained rigid inorganic oxide filler, and they had poor elasticity. More specifically, the thickness of the sheet-like separator became relatively small, its function to serve as a cushion became insufficient, and the rigid porous electron-insulating film was unable to follow the expansion and contraction of the electrode group during charge and discharge. As a result, the active material was separated from the negative electrode current collector, decreasing the current collecting efficiency as well as the capacity. Accordingly, in order to prevent the separation of the active material from the current collector, the sheet-like separator is required to have a thickness not less than 1.5 times the thickness of the porous electron-insulating film.

In the battery of EXAMPLE 2, the thickness of the porous electron-insulating film formed on the surface of the negative electrode was 1 µm, and the sheet-like separator comprising a 10 µm thick monolayer made of polypropylene resin was used. In other words, the thickness of the sheet-like separator was 10 times the thickness of the porous electron-insulating film. Yet, the effect of improving the charge/discharge cycle life characteristics was small in the battery of EXAMPLE 2.

Presumably, this is because the thickness of the electron-insulating material placed between the positive electrode and the negative electrode, that is, the total thickness of the porous electron-insulating film and the sheet-like separator was 11 µm, and thus the amount of electrolyte retained between the positive electrode and the negative electrode was small. Accordingly, in order to ensure sufficient amount of electrolyte between the positive electrode and the negative electrode, the total thickness of the porous electron-insulating film and the sheet-like separator is preferably not less than 15 µm.

Next, the discharge rate characteristics were analyzed.

In the battery of EXAMPLE 15 and those of COMPARATIVE EXAMPLEs 7 to 9 in which the total thickness of the porous electron-insulating film and the sheet-like separator was not less than 35 µm, the decrease in the capacity ratio (the ratio of the discharge capacity at 4000 mA to that at 400 mA expressed in percentage) was significant, and sufficient discharge rate characteristics were not obtained. In order to obtain excellent discharge rate characteristics, the total thickness of the porous electron-insulating film and the sheet-like separator is preferably not greater than 30 µm. The decrease of the designed capacity was the inevitable result of adjusting the lengths of the positive and negative electrodes such that the electrode group was able to be housed in the battery case.

Next, the charge storage characteristics in a high temperature atmosphere were analyzed.

In the batteries of EXAMPLEs 1 to 15, 17 and 18 and COMPARATIVE EXAMPLE 1 and 4 to 9 using a monolayer made of polypropylene resin as the sheet-like separator, excellent storage characteristics were obtained. Also, in the battery of EXAMPLE 16 in which a double-layer film comprising a layer made of polypropylene resin and a layer made of polyethylene resin was used as the sheet-like separator and the layer made of polypropylene resin was brought into contact with the positive electrode, excellent storage characteristics were obtained.

In the battery of COMPARATIVE EXAMPLE 2 using a monolayer film made of polyethylene resin as the sheet-like separator, and the battery of COMPARATIVE EXAMPLE 3 in which a double-layer film comprising a layer made of polypropylene resin and a layer made of polyethylene resin was used as the sheet-like separator and the layer made of polyethylene resin was brought into contact with the positive electrode, the storage characteristics were significantly low.

The foregoing results illustrate that the storage characteristics can be improved by using, as the sheet-like separator, a monolayer film made of polypropylene resin or a multilayer film including a layer made of polypropylene resin and bringing the layer made of polyethylene resin into contact with the positive electrode. Presumably, this is because the oxidation degradation of the sheet-like separator is inhibited.

Next, the charge/discharge cycle life characteristics in the case where the battery was charged at 4.3 V or 4.35 V were analyzed.

In the batteries of EXAMPLEs 1 to 17 in which porous electron-insulating films were formed on the surfaces of the negative electrode, a monolayer film or multilayer film having a thickness not less than 1.5 times the thickness of the porous electron-insulating film was used as the sheet-like separator, and the monolayer film made of polypropylene resin or the layer made of polypropylene resin in the multilayer film was brought into contact with the positive electrode, excellent cycle life characteristics were obtained compared to the batteries of COMPARATIVE EXAMPLEs 1 to 4. Furthermore, in the batteries of EXAMPLEs 3, 5 to 7, 9 to 11, 13 to 15, 16 and 17, particularly excellent charge/discharge cycle life characteristics were obtained. In the battery of EXAMPLE 17, extremely excellent charge/discharge cycle life characteristics were obtained.

Presumably, this is because, similar to the case of the charge/discharge cycle life test where the battery was charged to 4.2 V, the separation of the active material from the negative electrode current collector was prevented and sufficient amount of electrolyte was ensured between the positive electrode and the negative electrode. Moreover, it is also surmised that, by optimizing the arrangement of the sheet-like separator and the positive electrode, the oxidation degradation of the sheet-like separator was inhibited even in the highly charged state of 4.3 V or 4.35 V, which contributed to the achievement of excellent charge/discharge cycle life. Even in the battery of EXAMPLE 18 which was charged to 4.7 V, excellent charge/discharge cycle life was obtained compared to the battery of COMPARATIVE EXAMPLE 10.

The present invention is applicable to any lithium ion secondary battery, and it is particularly useful as the power sources for portable electronic devices that require both excellent storage characteristics and excellent cycle life characteristics. It should be noted that, although the examples were illustrated using the cylindrical lithium ion secondary battery, the scope of the present invention is not limited to the cylindrical battery, and the present invention is also applicable to batteries having various shapes including prismatic battery, coin type battery, etc.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium ion secondary battery comprising a positive electrode containing a composite lithium oxide, a negative electrode capable of absorbing and desorbing lithium ions, a sheet-like separator interposed between said positive electrode and said negative electrode, a non-aqueous electrolyte and a porous electron-insulating film attached to the surface of said negative electrode, wherein said separator is a monolayer film comprising a polypropylene resin or a multilayer film whose layer to be in contact with the positive electrode comprises a polypropylene resin, said porous electron-insulating film consists essentially of an inorganic oxide filler selected from the group consisting of aluminum oxide, silicon oxide, magnesium oxide, and zirconium oxide and a binder, and said separator has a thickness not less than 1.5 times the thickness of said porous electron-insulating film.

2. The lithium ion secondary battery in accordance with claim 1, wherein said porous electron-insulating film has a thickness of not less than 1 μm.

3. The lithium ion secondary battery in accordance with claim 1, wherein the total thickness of said separator and said porous electron-insulating film is not less than 15 μm and not greater than 30 μm.

4. A method for charging the lithium ion secondary battery in accordance with claim 1, wherein the battery is charged to a voltage of not less than 4.3 V.

5. A method for charging the lithium ion secondary battery in accordance with claim 1, wherein the battery is charged by a charger whose end-of-charge voltage is set to not less than 4.3 V.

6. A charge control system of a lithium ion secondary battery comprising the lithium ion secondary battery in accordance with claim 1 and a charger whose end-of-charge voltage is set to not less than 4.3 V.

7. A charge/discharge control system for controlling the lithium ion secondary battery in accordance with claim 1 to be within a predetermined voltage range, wherein the upper limit of said predetermined voltage range is set to not less than 4.3 V.

* * * * *

UNITED STATES PATENT AND TRADEMARK OFFICE
CERTIFICATE OF CORRECTION

PATENT NO. : 7,682,751 B2
APPLICATION NO. : 11/085106
DATED : March 23, 2010
INVENTOR(S) : Kiyomi Kato et al.

Page 1 of 1

It is certified that error appears in the above-identified patent and that said Letters Patent is hereby corrected as shown below:

IN THE CLAIMS:

In Column 7, Line 57, please delete "formula (2): $Li_xNi_{1-y-z}Mn_y\mathbf{CO}_zO_2$ or the general formula (3)" and insert --formula (2): $Li_xNi_{1-y-z}Mn_y\mathbf{Co}_zO_2$ or the general formula (3)--.

Signed and Sealed this

Ninth Day of November, 2010

David J. Kappos
*Director of the United States Patent and Trademark Office*